United States Patent
Wilms et al.

(10) Patent No.: US 10,351,671 B2
(45) Date of Patent: Jul. 16, 2019

(54) METHOD FOR PRODUCING SEMI-AROMATIC COPOLYAMIDES WITH A HIGH DIAMINE EXCESS

(71) Applicant: BASF SE, Ludwigshafen (DE)

(72) Inventors: Axel Wilms, Frankenthal (DE); Christian Schmidt, Ludwigshafen (DE); Florian Richter, Mannheim (DE); Joachim Clauss, Darmstadt (DE); Gad Kory, Gaiberg (DE); Stefan Schwiegk, Neustadt (DE); Arnold Schneller, Seeheim-Jugenheim (DE)

(73) Assignee: BASF SE, Ludwigshafen (DE)

( * ) Notice: Subject to any disclaimer, the term of this patent is extended or adjusted under 35 U.S.C. 154(b) by 720 days.

(21) Appl. No.: 14/896,939

(22) PCT Filed: Jun. 11, 2014

(86) PCT No.: PCT/EP2014/062116
§ 371 (c)(1),
(2) Date: Dec. 9, 2015

(87) PCT Pub. No.: WO2014/198764
PCT Pub. Date: Dec. 18, 2014

(65) Prior Publication Data
US 2016/0145389 A1    May 26, 2016

(30) Foreign Application Priority Data
Jun. 12, 2013 (EP) .................... 13171658

(51) Int. Cl.
*C08G 69/28* (2006.01)
(52) U.S. Cl.
CPC .................... *C08G 69/28* (2013.01)
(58) Field of Classification Search
None
See application file for complete search history.

(56) References Cited

U.S. PATENT DOCUMENTS

| 5,039,786 A * | 8/1991 | Pipper ............... C08G 69/36 |
| | | 526/64 |
| 5,109,106 A | 4/1992 | Lahary et al. |
| 5,270,437 A | 12/1993 | Marks |
| 5,310,860 A | 5/1994 | Maj et al. |
| 5,418,068 A | 5/1995 | Caluori et al. |
| 8,759,476 B2 | 6/2014 | Desbois et al. |
| 2007/0287088 A1 | 12/2007 | Sasaki et al. |
| 2011/0020594 A1* | 1/2011 | Trouillet-Fonti ....... C08L 77/00 |
| | | 428/114 |
| 2011/0105683 A1* | 5/2011 | Kato ............... C08G 69/265 |
| | | 524/607 |

FOREIGN PATENT DOCUMENTS

| CA | 2153862 A1 | 1/1996 |
| CN | 101687989 A | 3/2010 |
| DE | 41 42 978 C1 | 12/1992 |
| EP | 384 859 A1 | 8/1990 |
| EP | 550 315 A1 | 7/1993 |
| EP | 0 693 515 A1 | 1/1996 |
| EP | 1 860 134 A1 | 11/2007 |
| JP | 2004075962 A | 3/2004 |
| JP | 2007154356 A | 6/2007 |
| JP | 2007326816 A | 12/2007 |
| JP | 2011225830 A | 11/2011 |
| WO | WO-2004/055084 A2 | 7/2004 |

OTHER PUBLICATIONS

Machine English translation of previously cited JP 2011-225830.

* cited by examiner

*Primary Examiner* — Robert T Butcher
(74) *Attorney, Agent, or Firm* — Marshall, Gerstein & Borun LLP

(57) ABSTRACT

The present invention relates to a method for producing semi-aromatic copolyamides with a high diamine excess in the reaction batch.

21 Claims, No Drawings

METHOD FOR PRODUCING SEMI-AROMATIC COPOLYAMIDES WITH A HIGH DIAMINE EXCESS

CROSS-REFERENCE TO RELATED APPLICATION

This is the U.S. national phase of International Application No. PCT/EP2014/062116, filed Jun. 11, 2014, which claims the benefit of European Patent application No. 13171658.1, filed Jun. 12, 2013.

BACKGROUND OF THE INVENTION

The present invention relates to a process for preparing semiaromatic copolyamides with a high excess of diamine in the reaction mixture.

STATE OF THE ART

Polyamides are one of the polymers produced on a large scale globally and, in addition to the main fields of use in films, fibers and materials, serve for a multitude of further end uses. An important group of polyamides is that of semicrystalline or amorphous thermoplastic semiaromatic polyamides, which have found a wide range of use as important industrial plastics. They are especially notable for their high thermal stability and are also referred to as high-temperature polyamides (HTPA). An important field of use of the HTPAs is the production of electrical and electronic components, and suitable polymers for use in soldering operations under lead-free conditions (lead free soldering) are especially those based on polyphthalamide (PPA). HTPAs serve, inter alia, for production of plug connectors, microswitches and -buttons and semiconductor components, such as reflector housings of light-emitting diodes (LEDs). A further important field of use of the HTPAs is in high-temperature automotive applications. Important properties here are good heat aging resistance, and high strength and toughness and weld seam strength of the polymers used. Amorphous HTPAs or those having very low crystalline contents are transparent and are especially suitable for applications where transparency is advantageous. Semicrystalline HTPAs are generally notable for long-term stability at high ambient temperature and are suitable, for example, for applications in the engine bay area.

Polyamides for use in molding compositions for high-temperature applications have to have a complex profile of properties, it being necessary to reconcile good mechanical properties even in the event of prolonged thermal stress with good processability. More particularly, these polyamides are to have a sufficiently high molecular weight combined with not too high a polydispersity (PD). In addition, they are to feature good polymer properties, especially good mechanical properties, such as strength and toughness, a low melt viscosity and a low proportion of crosslinked polymer (gel content).

EP 550 315 A1 describes a process for preparing semi-aromatic polyamides, wherein diamines and dicarboxylic acids are used essentially in stoichiometric amounts.

EP 0 693 515 A1 describes a process for preparing precondensates of semicrystalline or amorphous, thermoplastically processible semiaromatic polyamides in a multi-stage batchwise operation. This likewise involves using diamines and dicarboxylic acids essentially in stoichiometric amounts.

DE 41 42 978 describes a multilayer composite system for reusable packaging materials composed of at least one copolyamide protective layer and at least one copolyamide barrier layer, wherein the copolyamides used are prepared batchwise. According to the working examples, the copolyamides are prepared in the melt in a pressure autoclave with nitrogen sparging. This document does not teach using the diamine component used for preparation of the copolyamides in the reactor composition with a stoichiometric excess of 300 to 650 meq/kg.

WO 2004/055084 describes semicrystalline, thermoplastically processible, semiaromatic copolyamides preparable by condensation of at least the following monomers or precondensates thereof: a) terephthalic acid, b) at least one dimerized fatty acid having up to 44 carbon atoms and c) at least one aliphatic diamine of the formula $H_2N$—$(CH_2)_x$—$NH_2$ in which x is an integer of 4-18. For preparation of the copolyamides, there is merely a general reference to known processes. This document does not teach an excess of the dining component in the reactor and composition of the polyamides of 300 to 650 meq/kg either.

EP 384 859 describes the preparation of a semiaromatic polyamide, wherein aromatic dicarboxylic acids and alkyl-pentamethylenediamines are used. This involves using the amine comonomers in an excess of 0.5 to 7% relative to the stoichiometric ratio. For PA 6.T/6.I, this corresponds to an amine excess of about 20 meq/kg polyamide to 280 meq/kg polyamide.

U.S. Pat. No. 5,270,437 describes a process for preparing high molecular weight semiaromatic polyamide, in which a reaction mixture comprising an aromatic diacid, at least a stoichiometric amount of a diamine component, the diamine component comprising at least 10 mol % of 2-methylpentamethylenediamine, and formic acid is used.

EP 1 860 134 describes a semiaromatic polyamide wherein 60 to 100 mol % of the diamine units derive from aliphatic diamines having 9 to 13 carbon atoms and the proportion of terminal amino groups is 60 to 120 meq/kg.

JP 2011225830 describes a process for preparing semi-aromatic polyamides, in which pentamethylenediamine, tetramethylenediamine and methylpentamethylenediamine are reacted with aromatic and aliphatic carboxylic acids at elevated temperature and under elevated pressure. In order to maintain equimolar amounts of amino end groups and carboxylic acid end groups in the course of the polycondensation and to attain a high molecular weight, an excess of diamine is added at the start, such that the molar ratio of diamine to dicarboxylic acid is within a range from 1.002 to 1.15.

There is still a need for semiaromatic copolyamides for polyamide molding compositions having an improved profile of properties in terms of processibility thereof and the mechanical properties obtained, specifically at high temperatures.

It is an object of the present invention to provide semi-aromatic copolyamides with improved properties. These are specifically to be suitable for production of polyamide molding compositions from which components for the automobile industry and the electrical/electronics sector are preferably produced.

It has been found that, surprisingly, the use of higher amounts of an aliphatic or cycloaliphatic diamine in the reaction mixture achieves copolyamides with a favorable profile of properties, as described above. This is especially true when the carboxylic acid component comprises or consists of terephthalic acid and/or isophthalic acid, and the diamine component comprises or consists of hexamethylenediamine. More particularly, the process according to the invention serves for preparation of PA 6.T/6.I.

More particularly, it is surprising that the polydispersity, given the diamine excess used in accordance with the invention, is reduced more significantly than in the case of a diacid excess, given the same molar amounts of the excess component. Such an advantageous effect of a diamine excess compared to a diacid excess cannot be inferred from the known prior art.

Moreover, it has been found that, surprisingly, the quotient of number-average molecular weight $M_n$ and polydispersity PD is a very suitable measure of the technical suitability of semiaromatic polyamides. For many applications of semiaromatic polyamides, it is advantageous when $M_n$ is high (to achieve good mechanical properties) and PD is at a minimum (to achieve good toughness and good flowability as a result of low crosslinking). Thus, the quotient of the two is of great technical significance, since it combines the two parameters with one another, and an optimum can only be achieved in the case of the inventive procedure. The higher this quotient, the more favorable the profile properties achieved. The favorable effect of an optimized $M_n$/PD ratio reflects the melt viscosity achieved in the semiaromatic polyamides, which depends not just on the molar mass but also to a high degree on the PD value.

SUMMARY OF THE INVENTION

The invention firstly provides a process for preparing a semiaromatic polyamide, in which
a) a reactant composition is provided, comprising
   A) at least one unsubstituted or substituted aromatic dicarboxylic acid or a derivative thereof and
   B) at least one aliphatic or cycloaliphatic diamine,
or a salt of at least one compound A) and at least one compound B),
b) the reactant composition provided in step a) is fed into at least one polymerization zone and subjected to a polymerization at elevated temperature and, at least at the start of the polymerization, at elevated pressure,
c) withdrawing a water-containing gas phase from the polymerization zone in the course of the polymerization,
with the proviso that the diamine component B) is used in the reactant composition with a stoichiometric excess of 300 to 650 meq/kg, wherein the stoichiometric excess of the diamine component B) in the reactant composition must be increased by any portion of the diamine component which is discharged from the polymerization zone together with the water-containing gas phase in the course of the polymerization.

The invention further provides a semiaromatic polyamide obtainable by a process as defined above and hereinafter.

The invention further provides a polyamide molding composition comprising at least one polyamide, obtainable by a process as defined above and hereinafter. The invention further provides a molding produced from such a polyamide molding composition.

The invention further provides for the use of a semiaromatic polyamide, or of a molding composition as defined above and hereinafter, for production of electrical and electronic components and for high-temperature automotive applications.

DESCRIPTION OF THE INVENTION

In the context of the invention, the "components capable of amide formation" are the components A) to I) defined in detail hereinafter.

In the context of this application, the unit meq/kg relates to the total weight of the components used for amide formation minus the weight of the water formed in the course of amide formation. The determination of the amount of water assumes a full conversion of the components used for amide formation. The components used for amide formation are understood to mean components A), B) and, if present, C) to I). The reference parameter is thus the polyamide as obtained from the components used for amide formation, assuming full monomer conversion.

For diamines, i.e. compounds having two amino groups capable of amide formation, 1 mmol/kg=2 meq/kg.

According to the invention, an excess of the diamine component B), reported in meq (milliequivalents) per kilogram, relative to the dicarboxylic acid component A) is thus used in the reactant composition. This takes account of any possible loss of diamine together with the water-containing gas phase removed in the course of the polymerization. The excess of the diamine component B) relative to the dicarboxylic acid component A) is not altered when lactams G) and/or co-amino acids H) are additionally used to prepare the semiaromatic polyamides, since these components do not alter the ratio of amino groups to carboxylic acid groups. The same applies to polyfunctional components I) having the same number of amino groups and carboxylic acid groups per molecule. Monofunctional components E) and F) and polyfunctional components I) having different numbers of amino groups and carboxylic acid groups per molecule are preferably only used in such small amounts that the stoichiometric excess of the diamine component B) relative to the dicarboxylic acid component A) is preserved.

It has surprisingly been found to be advantageous when the diamine component B) is used in the reactant composition with an excess of 300 to 650 meq/kg, i.e. with a corresponding excess over the stoichiometric ratio of amino groups capable of amide formation to the carboxyl groups capable of amide formation. Such an excess over the stoichiometric ratio of amino groups capable of amide formation to the carboxyl groups capable of amide formation is also referred to hereinafter as "stoichiometric excess" for short. If, in the course of the polymerization, a portion of the diamine component is discharged from the polymerization zone together with the water-containing gas phase, the excess of the diamine component B) in the reactant composition must be correspondingly higher.

Accordingly, the difference between the stoichiometric excess of the diamine component B) in the reactant composition and the portion of the diamine component discharged from the polymerization zone together with the water-containing gas phase is preferably 10 to 600 meq/kg. More preferably, the difference between the stoichiometric excess of the diamine component B) in the reactant composition and the portion of the diamine component discharged from the polymerization zone together with the water-containing gas phase is 50 to 500 meq/kg, especially 100 to 400 meq/kg.

To determine the portion of the diamine component B) which is discharged from the polymerization zone together with the water-containing gas phase, the stream discharged or an exactly defined portion thereof can be condensed and the proportion of the diamine component B) determined by acid titration by known methods of quantitative analysis. If, as well as the diamine component, further volatile constituents are discharged together with the gas phase, these can be identified and quantified by known methods of chromatography (e.g. capillary electrophoresis or HPLC).

The process according to the invention ensures that the excess of the diamine component B) is sufficiently large that any loss of diamine is markedly exceeded by evaporation and discharge from the polymerization zone. In the reaction mixture of the process according to the invention, the content of diamine component B) in the reaction mixture, either in the form of free diamine or in the form of diamine incorporated into the polymer chain, is thus well above the stoichiometric content of diamine which is required for a full reaction of the diamine with the dicarboxylic acids over the entire course of the polycondensation. It has been found that, surprisingly, the excess used in accordance with the invention of diamine in the reactant composition achieves a favorable high molecular weight of the semiaromatic polyamide obtained with simultaneously favorable low polydispersity ($PD=M_w/M_n$). It has additionally been found that particularly good polymer properties, such as good mechanical properties (for example strength and toughness), low melt viscosity and a low gel content, are achieved when the quotient of number-average molecular weight $M_n$ to PD is at least 7000.

The condensation of the monomers of the acid component and of the diamine component, and also of any lactam component used, forms repeat units or end groups in the form of amides derived from the respective monomers. These monomers generally account for 95 mol %, especially 99 mol %, of all the repeat units and end groups present in the copolyamide. In addition, the copolyamide may also comprise small amounts of other repeat units which may result from degradation reactions or side reactions of the monomers, for example of the diamines.

The polyamides are designated in the context of the invention using abbreviations, some of which are customary in the art, which consist of the letters PA followed by numbers and letters. Some of these abbreviations are standardized in DIN EN ISO 1043-1. Polyamides which can be derived from aminocarboxylic acids of the $H_2N-(CH_2)_x-COOH$ type or the corresponding lactams are identified as PA Z where Z denotes the number of carbon atoms in the monomer. For example, PA 6 represents the polymer of ε-caprolactam or of w-aminocaproic acid. Polyamides which derive from diamines and dicarboxylic acids of the $H_2N-(CH_2)_x-NH_2$ and $HOOC-(CH_2)_y-COOH$ types are identified as PA Z1Z2 where Z1 denotes the number of carbon atoms in the diamine and Z2 the number of carbon atoms in the dicarboxylic acid. Copolyamides are designated by listing the components in the sequence of their proportions, separated by slashes. For example, PA 66/610 is the copolyamide of hexamethylenediamine, adipic acid and sebacic acid.

For the monomers having an aromatic or cycloaliphatic group which are used in accordance with the invention, the following letter abbreviations are used: T=terephthalic acid, I=isophthalic acid, MXDA=m-xylylenediamine, IPDA=isophoronediamine, PACM=4,4'-methylenebis(cyclohexylamine), MACM=2,2'-dimethyl-4,4'-methylenebis(cyclohexylamine).

Hereinafter, the expression "$C_1$-$C_4$-alkyl" comprises unsubstituted straight-chain and branched $C_1$-$C_4$-alkyl groups. Examples of $C_1$-$C_4$-alkyl groups are especially methyl, ethyl, propyl, isopropyl, n-butyl, isobutyl, sec-butyl, tert-butyl (1,1-dimethylethyl).

In the aromatic dicarboxylic acids, aliphatic dicarboxylic acids, cycloaliphatic dicarboxylic acids and monocarboxylic acids mentioned hereinafter, the carboxyl groups may each be present in underivatized form or in the form of derivatives. In the case of dicarboxylic acids, neither carboxyl group, one carboxyl group or both carboxyl groups may be in the form of a derivative. Suitable derivatives are anhydrides, esters, acid chlorides, nitriles and isocyanates. Preferred derivatives are anhydrides or esters. Anhydrides of dicarboxylic acids may be in monomeric or in polymeric form. Preferred esters are alkyl esters and vinyl esters, more preferably $C_1$-$C_4$-alkyl esters, especially the methyl esters or ethyl esters. Dicarboxylic acids are preferably in the form of mono- or dialkyl esters, more preferably mono- or di-$C_1$-$C_4$-alkyl esters, more preferably monomethyl esters, dimethyl esters, monoethyl esters or diethyl esters. Dicarboxylic acids are additionally preferably in the form of mono- or divinyl esters. Dicarboxylic acids are additionally preferably in the form of mixed esters, more preferably mixed esters with different $C_1$-$C_4$-alkyl components, especially methyl ethyl esters.

The aromatic dicarboxylic acids A) are preferably selected from in each case unsubstituted or substituted phthalic acid, terephthalic acid, isophthalic acid, naphthalenedicarboxylic acids or diphenyldicarboxylic acids, and the derivatives and mixtures of the aforementioned aromatic dicarboxylic acids.

Substituted aromatic dicarboxylic acids A) preferably have at least one (e.g. 1, 2, 3 or 4) $C_1$-$C_4$-alkyl radical. More particularly, substituted aromatic dicarboxylic acids A) have 1 or 2 $C_1$-$C_4$-alkyl radicals. These are preferably selected from methyl, ethyl, n-propyl, isopropyl, n-butyl, isobutyl, sec-butyl and tert-butyl, more preferably methyl, ethyl and n-butyl, particularly methyl and ethyl and especially methyl. Substituted aromatic dicarboxylic acids A) may also bear further functional groups which do not disrupt the amidation, for example 5-sulfoisophthalic acid, and salts and derivatives thereof. A preferred example thereof is the sodium salt of dimethyl 5-sulfoisophthalate.

Preferably, the aromatic dicarboxylic acid A) is selected from unsubstituted terephthalic acid, unsubstituted isophthalic acid, unsubstituted naphthalenedicarboxylic acids, 2-chloroterephthalic acid, 2-methylterephthalic acid, 5-methylisophthalic acid and 5-sulfoisophthalic acid.

More preferably, the aromatic dicarboxylic acid A) used is terephthalic acid, isophthalic acid or a mixture of terephthalic acid and isophthalic acid.

Preferably, the semiaromatic polyamides have a proportion of aromatic dicarboxylic acids among all the dicarboxylic acids of at least 50 mol %, more preferably of 70 mol % to 100 mol %. In a specific embodiment, the semiaromatic polyamides have a proportion of terephthalic acid or isophthalic acid or a mixture of terephthalic acid and isophthalic acid, based on all the dicarboxylic acids, of at least 50 mol %, preferably of 70 mol % to 100 mol %.

Preferably, the reactant composition provided in step a) comprises, as component A), terephthalic acid and isophthalic acid in a molar ratio of 100:0 to 50:50, more preferably of 90:10 to 60:40.

The aliphatic or cycloaliphatic diamines B) are preferably selected from ethylenediamine, propylenediamine, tetramethylenediamine, heptamethylenediamine, hexamethylenediamine, pentamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane and mixtures thereof.

In a specific embodiment, the diamine B) is not pentamethylenediamine, tetramethylenediamine or methylpentamethylenediamine.

More preferably, the diamine B) is selected from hexamethylenediamine, 2-methylpentamethylenediamine, octamethylenediamine, nonamethylenediamine, decamethylenediamine, undecamethylenediamine, dodecamethylenediamine, bis(4-aminocyclohexyl)methane, 3,3'-dimethyl-4,4'-diaminodicyclohexylmethane and mixtures thereof.

Preferably, the diamine component B) consists of hexamethylenediamine to an extent of at least 50% by weight, more preferably to an extent of at least 75% by weight, particularly to an extent of at least 90% by weight, especially to an extent of at least 92% by weight, based on the total weight of the diamine component B).

In a specific implementation, the reactant composition provided in step a) comprises hexamethylenediamine as the sole diamine.

In a specific embodiment, the reactant composition provided in step a) does not comprise any further components capable of amide formation in addition to components A) and B).

In a further specific implementation, the reactant composition provided in step a) comprises at least one further component capable of amide formation, selected from C) unsubstituted or substituted aromatic diamines,
D) aliphatic or cycloaliphatic dicarboxylic acids,
E) monocarboxylic acids,
F) monoamines,
G) lactams,
H) ω-amino acids,
I) compounds which are different than A) to H) and are cocondensable therewith, and mixtures thereof.

The proportion of component C) is preferably 0 to 20% by weight, more preferably 0 to 15% by weight, based on the total weight of components A) to I).

The proportion of component D) is preferably 0 to 20% by weight, more preferably 0 to 15% by weight, based on the total weight of components A) to I).

The proportion of component E) is preferably 0 to 100 meq/kg, more preferably 0 to 50 meq/kg, based on the total weight of the components used for amide formation minus the weight of the water formed in the course of amide formation.

The proportion of component F) is preferably 0 to 100 meq/kg, more preferably 0 to 50 meq/kg, based on the total weight of the components used for amide formation minus the weight of the water formed in the course of amide formation.

The proportion of component G) is preferably 0 to 20% by weight, more preferably 0 to 15% by weight, based on the total weight of components A) to I).

The proportion of component H) is preferably 0 to 20% by weight, more preferably 0 to 15% by weight, based on the total weight of components A) to I).

The proportion of component I) is preferably 0 to 10% by weight, more preferably 0 to 5% by weight, based on the total weight of components A) to I).

The term "aromatic diamines" in the context of the invention generally refers to compounds having at least one aromatic group and at least one amino group. This amino group need not be bonded directly to the aromatic group. Suitable aromatic diamines C) are selected from bis(4-aminophenyl)methane, 3-methylbenzidine, 2,2-bis(4-aminophenyl)propane, 1,1-bis(4-aminophenyl)cyclohexane, 1,2-diaminobenzene, 1,4-diaminobenzene, 1,4-diaminonaphthalene, 1,5-diaminonaphthalene, 1,3-diamino-toluene(s), m-xylylenediamine, N,N'-dimethyl-4,4'-biphenyldiamine, bis(4-methylamino-phenyl)methane, 2,2-bis(4-methylaminophenyl)propane or mixtures thereof.

The aliphatic or cycloaliphatic dicarboxylic acids C) are preferably selected from oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, maleic acid, fumaric acid or itaconic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid and mixtures thereof.

The reactant composition provided in step a) may comprise at least one monocarboxylic acid E). The monocarboxylic acids E) serve to end-cap the polyamides prepared in accordance with the invention. Suitable monocarboxylic acids are in principle all of those capable of reacting with at least some of the amino groups available under the reaction conditions of the polyamide condensation. Suitable monocarboxylic acids E) are aliphatic monocarboxylic acids, alicyclic monocarboxylic acids and aromatic monocarboxylic acids. These include acetic acid, propionic acid, n-, iso- or tert-butyric acid, valeric acid, trimethylacetic acid, caproic acid, enanthic acid, caprylic acid, pelargonic acid, capric acid, undecanoic acid, lauric acid, tridecanoic acid, myristic acid, palmitic acid, stearic acid, pivalic acid, cyclohexanecarboxylic acid, benzoic acid, methylbenzoic acids, α-naphthalenecarboxylic acid, β-naphthalenecarboxylic acid, phenylacetic acid, oleic acid, ricinoleic acid, linoleic acid, linolenic acid, erucic acid, fatty acids from soya, linseeds, castor oil plants and sunflowers, acrylic acid, methacrylic acid, Versatic® acids, Koch® acids and mixtures thereof.

If the monocarboxylic acids E) used are unsaturated carboxylic acids or derivatives thereof, it may be advisable to work in the presence of commercial polymerization inhibitors.

More preferably, the monocarboxylic acid E) is selected from acetic acid, propionic acid, benzoic acid and mixtures thereof.

The reactant composition provided in step a) may comprise at least one monoamine F). The monoamines F) serve to end-cap the polyamides prepared in accordance with the invention. Suitable monoamines are in principle all of those capable of reacting with at least some of the carboxylic acid groups available under the reaction conditions of the polyamide condensation. Suitable monoamines F) are aliphatic monoamines, alicyclic monoamines and aromatic monoamines. These include methylamine, ethylamine, butylamine, propylamine, hexylamine, heptylamine, octylamine, decylamine, stearylamine, dimethylamine, diethylamine, dipropylamine, dibutylamine, cyclohexylamine, dicyclohexylamine, aniline, toluidine, diphenylamine, naphthylamine and mixtures thereof.

Suitable lactams G) are ε-caprolactam, 2-piperidone (δ-valerolactam), 2-pyrrolidone (γ-butyrolactam), capryllactam, enantholactam, lauryllactam and mixtures thereof.

Suitable ω-amino acids H) are 6-aminocaproic acid, 7-aminoheptanoic acid, 11-amino-undecanoic acid, 12-aminododecanoic acid and mixtures thereof. Preferably, the reactant composition provided in step a) does not comprise any lactams H).

Suitable compounds I) which are different than A) to H) and are cocondensable therewith are at least tribasic carboxylic acids, diaminocarboxylic acids, etc.

Suitable trifunctional amines I) are N'-(6-aminohexyl)hexane-1,6-diamine, N'-(12-aminododecyl)dodecane-1,12-diamine, N'-(6-aminohexyl)dodecane-1,12-diamine, N'-[3-(aminomethyl)-3,5,5-trimethylcyclohexyl]hexane-1,6-diamine, N'-[3-(aminomethyl)-3,5,5-trimethylcyclohexyl]dodecane-1,12-diamine, N'-[(5-amino-1,3,3-trimethylcyclohexyl)methyl]hexane-1,6-diamine, N'-[(5-amino-1,3,3-trimethylcyclohexyl)methyl]dodecane-1,12-diamine, 3-[[[3-(aminomethyl)-3,5,5-trimethylcyclohexyl]amino]methyl]-3,5,5-trimethylcyclohexanamine, 3-[[(5-amino-1,3,3-trimethylcyclohexyl)methylamino]methyl]-3,5,5-trimethylcyclohexanamine, 3-(aminomethyl)-N-[3-(aminomethyl)-3,5,5-trimethylcyclohexyl]-3,5,5-trimethylcyclohexanamine. Preferably, the reactant composition provided in step a) does not comprise any trifunctional amines I).

Suitable compounds I) are additionally 4-[(Z)—N-(6-aminohexyl)-C-hydroxycarbonimidoyl]benzoic acid, 3-[(Z)—N-(6-aminohexyl)-C-hydroxycarbonimidoyl]benzoic acid, (6Z)-6-(6-aminohexylimino)-6-hydroxyhexanecarboxylic acid, 4-[(Z)—N-[(5-amino-1,3,3-trimethylcyclohexyl)methyl]-C-hydroxycarbonimidoyl]benzoic acid, 3-[(Z)—N-[(5-amino-1,3,3-trimethylcyclohexyl)methyl]-C-hydroxycarbonimidoyl]benzoic acid, 4-[(Z)—N-[3-(aminomethyl)-3,5,5-trimethylcyclohexyl]-C-hydroxycarbonimidoyl]benzoic acid, 3-[(Z)—N-[3-(aminomethyl)-3,5,5-trimethylcyclohexyl]-C-hydroxycarbonimidoyl]benzoic acid and mixtures thereof.

The semiaromatic polyamide obtained by the process according to the invention preferably has a number-average molecular weight $M_n$ within a range from 13 000 to 25 000 g/mol, more preferably from 15 000 to 20 000 g/mol.

The semiaromatic polyamide obtained by the process according to the invention preferably has a weight-average molecular weight $M_w$ within a range from 20 000 to 140 000 g/mol.

The figures for the number-average molecular weight $M_n$ and for the weight-average molecular weight $M_w$ in the context of this invention are each based on a determination by means of gel permeation chromatography (GPC). For calibration, PMMA is used as a polymer standard with a low polydispersity.

The semiaromatic polyamide obtained by the process according to the invention preferably has a polydispersity PD ($=M_w/M_n$) of not more than 3, more preferably of not more than 2.5.

The semiaromatic polyamide obtained by the process according to the invention preferably has a quotient of number-average molecular weight $M_n$ to PD ($M_n$/PD) of at least 7000, preferably of at least 7500.

The semiaromatic polyamide obtained by the process according to the invention preferably has an amine end group content (AEG) of 300 to 500 meq/kg.

The semiaromatic polyamide obtained by the process according to the invention preferably has a carboxylic acid end group content (CEG) of not more than 50 meq/kg.

The relative viscosity (RV) is determined in the context of this invention at 25° C. as a solution in 96% by weight $H_2SO_4$ having a concentration of 1.0 g of polyamide in 100 ml of sulfuric acid. The determination of relative viscosity follows EN ISO 307. The semiaromatic polyamide obtained by the process according to the invention preferably has a relative viscosity of 1.4 to 2.4, more preferably 1.5 to 2.1.

To prepare the semiaromatic polyamides, the reactant composition provided in step a) is fed into at least one polymerization zone and subjected to a polymerization at elevated temperature and, at least at the start of the polymerization, at elevated pressure (=step b).

The inventive semiaromatic polyamides can in principle be prepared by customary processes known to those skilled in the art. The preparation of semiaromatic polyamides generally begins with the formation of an aqueous salt solution from at least one diamine and at least one dicarboxylic acid. The formation of the salt solution is then followed by an oligomerization in the liquid aqueous phase. For the desired increase in molecular weight, it is then necessary to remove water later in the process and to increase the reaction temperature. To increase the molecular weight further, two alternative routes are available in principle. In the first variant, the oligomer formed is converted by dewatering to the solid phase and subjected to what is called a solid state polymerization (SSP). In the second variant, water is removed in a controlled manner and the temperature is increased to convert the aqueous solution to the melt for further polycondensation. To further increase the molecular weight, a postpolymerization, for example in an extruder, may then follow if required.

Some of the possible processes are to be detailed by way of example hereinafter, the disclosure content of these documents regarding the preparation of the semiaromatic copolyamides being fully incorporated into the disclosure content of the present application.

A suitable process is described, for example, in EP 0 693 515 A1. This involves the preparation of precondensates of semiaromatic polyamides in a multistage batchwise operation comprising the following stages a) to e):

a) a salt formation phase for preparation of salt(s) from diamine(s) and dicarboxylic acid(s) and optionally partial prereaction to give low molecular weight oligoamides at temperatures between 120° C. and 220° C. and pressures of up to 23 bar, b) optionally the transfer of the solution from stage a) into a second reaction vessel or a stirred autoclave under the conditions which exist at the end of preparation thereof, c) the reaction phase, during which the conversion to the precondensates is promoted, through heating of the reactor contents to a given temperature and controlled adjustment of the partial steam pressure to a given value which is maintained by controlled release of steam or optionally controlled introduction of steam from a steam generator connected to the autoclave, d) a steady-state phase which has to be maintained for at least 10 minutes, in the course of which the temperature of the reactor contents and the partial steam pressure are each set to the values envisaged for the transfer of the precondensates into the downstream process stage, where the temperature of the reactor contents during phases c) and d) must not exceed 265° C. in the case of precondensates of semicrystalline (co)polyamides having a melting point of more than 280° C., and particular, more accurately defined boundary conditions in relation to the dependence of the minimum partial steam pressure $P_{H2O}$ (minimum) to be employed on the temperature of the reactor contents and the amide group concentration of the polymer have to be complied with for said semicrystalline (co)polyamides during phases c) and d), and e) a discharge phase, during which the precondensates can be supplied to a final reaction apparatus either directly in the molten state or after passing through the solid state and optionally further process stages.

EP 0976774 A2 describes a process for preparing polyamides, comprising the following steps:
i) polycondensing a dicarboxylic acid component comprising terephthalic acid, and a diamine component having a 1,9-nonanediamine and/or 2-methyl-1,8-octanediamine content of 60 to 100 mol % in the presence of 15 to 35% by weight of water at a reaction temperature of 250 to 280° C. and a reaction pressure which satisfies the following equation:

$$P_0 \geq P \geq 0.7 P_0$$

where $P_0$ is the saturation vapor pressure of water at the reaction temperature, to obtain a primary polycondensate,
(ii) discharging the primary polycondensate from step i) in an atmospheric environment with the same temperature range and at the same water content as in step i),
(iii) increasing the molecular weight by subjecting the discharge from step ii) to a solid state polymerization or a melt polymerization.

EP 0 129 195 A1 describes a process for continuously preparing polyamides, in which an aqueous solution of salts of dicarboxylic acids and diamines is heated to a temperature of 250 to 300° C. in an evaporator zone under elevated pressure with simultaneous evaporation of water and formation of a prepolymer, prepolymer and vapor are separated continuously, the vapors are rectified and entrained diamines are recycled, the prepolymer is passed into a polycondensation zone and condensed under a gauge pressure of 1 to 10 bar at a temperature of 250 to 300° C., wherein the aqueous salt solution is heated under a gauge pressure of 1 to 10 bar within a residence time of not more than 60 seconds, with the proviso that the degree of conversion on exit from the evaporator zone is at least 93% and the water content of the prepolymer is not more than 7% by weight.

EP 0 129 196 A1 describes a process analogous to EP 0 129 195 A1, in which the aqueous salt solution is condensed in the first third of a tubular precondensation zone provided with internals under a gauge pressure of 1 to 10 bar up to a degree of conversion of at least 93% and the prepolymer and the vapor phase are brought into intimate contact with one another in the remaining two thirds of the precondensation zone.

WO 02/28941 describes a continuous process for hydrolytic polymerization of polyamides, comprising:
a) polymerizing an aqueous salt solution of diacids and diamines under conditions of temperature and pressure sufficient to yield a reaction mixture in multiple phases, but for a time sufficient to avoid phase separation,
b) transferring heat into said reaction mixture while reducing pressure of said reaction mixture sufficient to remove the water therefrom without solidification thereof,
c) further polymerizing said reaction mixture having the water removed and until the desired molecular weight is achieved.

U.S. Pat. No. 4,019,866 describes a process and an apparatus for continuous polyamide preparation. In the process, the polyamide-forming reactants are pumped continuously into a reaction zone designed to permit rapid heating and homogeneous mixing. The reactants are heated and mixed homogeneously within the reaction zone for a predetermined hold-up time and at an elevated temperature and elevated pressure to form a vapor and a prepolymer. The vapor formed is continuously separated from the prepolymers and the prepolymers are withdrawn from the reaction zone. The apparatus used is configured in the manner of a column and comprises a rectifying zone and a first and second reaction zone. In the first reaction zone a polyamide-forming salt solution is partly vaporized and partly converted, and in the second reaction zone the reaction is continued at a lower pressure than in the first reaction zone. The vapor from the first reaction zone is released through the rectifying zone.

EP 0 123 377 A2 describes a condensation process which serves, inter alia, for preparation of polyamides. In this process, a salt solution or a prepolymer is expanded in a flash reactor at a relative pressure (gauge pressure) of 0 to 27.6 bar. The residence time in the flash reactor is 0.1 to 20 seconds. In a specific implementation, a prepolymerization is first effected at a temperature of 191 to 232° C. and a solvent content (water content) of less than 25% by weight. The resulting salt solution is then brought to a relative pressure of 103.4 to 206.8 bar, and only then is the temperature increased to a value above the melting temperature and the solution expanded. The polymer can be fed into a twin-screw extruder and subjected there to a polymerization at a residence time of about 45 seconds to 7 minutes.

DE 4329676 A1 describes a process for continuous polycondensation of high molecular weight, especially amorphous, semiaromatic copolyamides, wherein a precondensate is first prepared from an aqueous reaction mixture while heating and at pressure at least 15 bar, then the temperature and pressure are increased to prepare a prepolymer and ultimately the copolyamide through condensation in a vented extruder. In the course of this, the water content is reduced as early as in the precondensation stage, and at the end of the precondensation is about 5 to 40% by weight. The prepolymer is then prepared at 220 to 350° C. and a pressure of at least 20 bar. The postpolymerization is then performed in a twin-screw extruder with venting zones.

Preferably, the polymerization in step b) comprises that the reactant composition provided in step a) is fed into a first polymerization zone (oligomerization zone) and subjected to an oligomerization at a temperature of 150 to 290° C. and an absolute pressure of at least 5 bar. Preferably, the temperature in the first polymerization zone is within a range from 150 to 250° C.

In a first suitable variant, a water-containing gas phase is withdrawn from the first polymerization zone from the very start of the polymerization. In the case of use of appropriately low-boiling diamines, especially of hexamethylenediamine, the gas phase thus removed comprises, as well as water vapor, proportions of the diamine component B) used.

In a second variant, the early phase of the oligomer formation is effected without mass transfer with the environment, i.e. more particularly without the immediate removal of a water-containing gas phase. In that case, a proportion of the diamines B) from the reactant composition is directly subjected to a condensation with amide formation before a water-containing gas phase is withdrawn from the first polymerization zone. In this second variant, the content of the diamine component B) in the gas phase thus removed is lower than in the first variant.

Preferably, the reaction mixture from the first reaction zone, after the oligomer formation has ended, is subjected to an expansion to obtain a water-containing gas phase and a phase comprising the polyamide oligomers. The water-containing gas phase obtained in this expansion may also comprise a portion of the diamine component B).

The further increase in molecular weight can then be effected by customary processes, as described above.

For preparation of the inventive polyamides, it is possible to use at least one catalyst. Suitable catalysts are preferably selected from inorganic and/or organic phosphorus, tin or lead compounds, and mixtures thereof.

Examples of tin compounds suitable as catalysts include tin(II) oxide, tin(II) hydroxide, tin(II) salts of mono- or polybasic carboxylic acids, e.g. tin(II) dibenzoate, tin(II) di(2-ethylhexanoate), tin(II) oxalate, dibutyltin oxide, butyltin acid ($C_4H_9$—SnOOH), dibutyltin dilaurate, etc. Suitable lead compounds are, for example, lead(II) oxide, lead(II) hydroxide, lead(II) acetate, basic lead(II) acetate, lead(II) carbonate, etc.

Preferred catalysts are phosphorus compounds such as phosphoric acid, phosphorous acid, hypophosphorous acid, phenylphosphonic acid, phenylphosphinic acid and/or salts thereof with mono- to trivalent cations, for example Na, K, Mg, Ca, Zn or Al and/or esters thereof, for example triphenyl phosphate, triphenyl phosphite or tris(nonylphenyl) phosphite. Particularly preferred catalysts are hypophosphorous acid and salts thereof, such as sodium hypophosphite.

The catalysts are preferably used in an amount of 0.005 to 2.5 parts by weight, based on the total weight of components A) to I).

Particular preference is given to using hypophosphorous acid and/or a salt in an amount of 0.01 to 1.5 parts by weight, more preferably of 0.05 to 1 part by weight, based on the total amount of components A) to I).

For control of the molar mass, it is possible to use at least one chain transfer agent, preferably selected from monocarboxylic acids and monoamines. The chain transfer agent is preferably selected from acetic acid, propionic acid, butyric acid, valeric acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl)propanoic acid, 2-(3,5-di-tert-butyl-4-hydroxybenzylthio)acetic acid, 3,3-bis(3-tert-butyl-4-hydroxyphenyl)butanoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, 2,2,6,6-tetramethylpiperidin-4-amine, 1,2,2,6,6-pentamethylpiperidin-4-amine, 4-amino-2,6-di-tert-butylphenol and mixtures thereof. It is also possible to use other monofunctional compounds which can react with an amino or acid group as the transfer agent, such as anhydrides, isocyanates, acid halides or esters. The chain transfer agent can be added to the reaction mixture before or at the start of the oligomerization and/or to the prepolymer prior to the postpolymerization. The customary use amount of the chain transfer agents is within a range from 5 to 200 mmol per kg of polymer, preferably 10 to 100 mmol per kg of polymer.

In a specific embodiment, the inventive copolyamides are prepared by providing an aqueous composition composed of terephthalic acid a), isophthalic acid b), hexamethylenediamine c) and at least one cyclic diamine d) and subjecting it to salt formation. If desired, further components such as catalysts, chain transfer agents and different additives can be added to this solution. Suitable additives are described in detail hereinafter for the polyamide molding compositions. The additives which can also be added directly in the course of preparation of the inventive polyamides include, for example, antioxidants, light stabilizers, customary processing aids, nucleating agents and crystallization accelerators. These can generally be added to the inventive polyamides at any stage in the preparation. It is also possible to use fillers and reinforcers as early as in the course of production of the inventive polyamides. Fillers and reinforcers are preferably added before and/or during the final postpolymerization. For example, they can be added to the inventive copolyamides in the course of postpolymerization in an extruder or kneader. In this case, it is advantageous when the extruder has suitable mixing elements, such as kneading blocks.

This composition provided for preparation of the inventive semiaromatic polyamides preferably has a water content of 5 to 50% by weight, more preferably of 10 to 25% by weight, based on the total weight of the solution.

The aqueous composition can be prepared in a customary reaction apparatus, for example in a stirred tank. Preference is given to mixing the components while heating. Preferably, the aqueous composition is prepared under conditions under which there is essentially no oligomerization yet. Preferably, the temperature in the course of preparation of the aqueous composition in step a) is within a range from 80 to 170° C., more preferably from 100 to 165° C. Preference is given to preparing the aqueous composition at ambient pressure or under elevated pressure. The pressure is preferably within a range from 0.9 to 50 bar, more preferably from 1 bar to 10 bar. In a specific implementation, the aqueous composition is prepared at the autogenous pressure of the reaction mixture. The aqueous composition can be prepared in an inert gas atmosphere. Suitable inert gases are, for example, nitrogen, helium or argon. In many cases, full inertization is not required; instead, merely purging of the reaction apparatus with an inert gas prior to heating of the components is sufficient. In a suitable procedure for preparation of the aqueous composition, the diamine component is initially charged in the reaction apparatus dissolved in at least a portion of the water. Subsequently, the other components are added, preferably while stirring, and the water content is adjusted to the desired amount. The reaction mixture is heated while stirring until a clear homogeneous solution has formed. The aqueous composition thus obtained is preferably used for oligomerization essentially at the preparation temperature, i.e. without any intermediate cooling.

The oligomerization to form prepolymers and the postpolymerization to increase the molecular weight can be effected by customary processes known to those skilled in the art. Some examples of such processes have already been mentioned above.

The inventive semiaromatic copolyamides, before being processed to give polyamide molding compositions, can be subjected to a shaping operation to obtain polyamide particles. Preferably, the polyamide is first shaped to one or more strands. For this purpose, it is possible to use apparatuses known to those skilled in the art, for example extruders having perforated plates, dies or die plates, for example, on the discharge side. Preferably, the semiaromatic polyamide is shaped in the free-flowing state to strands and subjected to pelletization in the form of strands of free-flowing reaction product or after cooling.

Polyamide Molding Composition

The invention further provides a polyamide molding composition comprising at least one inventive semiaromatic copolyamide.

Preference is given to a polyamide molding composition comprising:
A) 25 to 100% by weight at least one semiaromatic copolyamide, as defined above,
B) 0 to 75% by weight of at least one filler and reinforcer,
C) 0 to 50% by weight of at least one additive,
where components A) to C) together add up to 100% by weight.

The term "filler and reinforcer" (=component B) is understood in a broad sense in the context of the invention and comprises particulate fillers, fibrous substances and any intermediate forms. Particulate fillers may have a wide range of particle sizes ranging from particles in the form of dusts to large grains. Useful filler materials include organic or inorganic fillers and reinforcers. For example, it is possible to use inorganic fillers, such as kaolin, chalk, wollastonite, talc, calcium carbonate, silicates, titanium dioxide, zinc oxide, graphite, glass particles, e.g. glass beads, nanoscale fillers, such as carbon nanotubes, carbon black, nanoscale sheet silicates, nanoscale alumina ($Al_2O_3$), nanoscale titania ($TiO_2$), graphene, permanently magnetic or magnetizable metal compounds and/or alloys, sheet silicates and nanoscale silica ($SiO_2$). The fillers may also have been surface treated.

Examples of sheet silicates which can be used in the inventive molding compositions include kaolins, serpentines, talc, mica, vermiculites, illites, smectites, montmorillonite, hectorite, double hydroxides or mixtures thereof. The sheet silicates may have been surface treated or may be untreated.

In addition, it is possible to use one or more fibrous substances. These are preferably selected from known inorganic reinforcing fibers, such as boron fibers, glass fibers, carbon fibers, silica fibers, ceramic fibers and basalt fibers; organic reinforcing fibers, such as aramid fibers, polyester fibers, nylon fibers, polyethylene fibers and natural fibers, such as wood fibers, flax fibers, hemp fibers and sisal fibers.

It is especially preferable to use glass fibers, carbon fibers, aramid fibers, boron fibers, metal fibers or potassium titanate fibers.

Specifically, chopped glass fibers are used. More particularly, component B) comprises glass fibers and/or carbon fibers, preference being given to using short fibers. These preferably have a length in the range from 2 to 50 mm and a diameter of 5 to 40 μm. Alternatively, it is possible to use continuous fibers (rovings). Suitable fibers are those having a circular and/or noncircular cross-sectional area, in which latter case the ratio of dimensions of the main cross-sectional axis to the secondary cross-sectional axis is especially >2, preferably in the range from 2 to 8 and more preferably in the range from 3 to 5.

In a specific implementation, component B) comprises what are called "flat glass fibers". These specifically have a cross-sectional area which is oval or elliptical or elliptical and provided with indentation(s) (called "cocoon" fibers), or rectangular or virtually rectangular. Preference is given here to using glass fibers with a noncircular cross-sectional area and a ratio of dimensions of the main cross-sectional axis to the secondary cross-sectional axis of more than 2, preferably of 2 to 8, especially of 3 to 5.

For reinforcement of the inventive molding compositions, it is also possible to use mixtures of glass fibers having circular and noncircular cross sections. In a specific implementation, the proportion of flat glass fibers, as defined above, predominates, meaning that they account for more than 50% by weight of the total mass of the fibers.

If rovings of glass fibers are used as component B), these preferably have a diameter of 10 to 20 μm, preferably of 12 to 18 μm. In this case, the cross section of the glass fibers may be round, oval, elliptical, virtually rectangular or rectangular. Particular preference is given to what are called flat glass fibers having a ratio of the cross-sectional axes of 2 to 5. More particularly, E glass fibers are used. However, it is also possible to use all other glass fiber types, for example A, C, D, M, S or R glass fibers or any desired mixtures thereof, or mixtures with E glass fibers.

The inventive polyamide molding compositions can be produced by the known processes for producing long fiber-reinforced rod pellets, especially by pultrusion processes, in which the continuous fiber strand (roving) is fully saturated with the polymer melt and then cooled and cut. The long fiber-reinforced rod pellets obtained in this manner, which preferably have a pellet length of 3 to 25 mm, especially of 4 to 12 mm, can be processed by the customary processing methods, for example injection molding or press molding, to give moldings.

The inventive polyamide molding composition comprises preferably 25 to 75% by weight, more preferably 33 to 60% by weight, of at least one filler or reinforcer B), based on the total weight of the polyamide molding composition.

Suitable additives C) are heat stabilizers, flame retardants, light stabilizers (UV stabilizers, UV absorbers or UV blockers), lubricants, dyes, nucleating agents, metallic pigments, metal flakes, metal-coated particles, antistats, conductivity additives, demolding agents, optical brighteners, defoamers, etc.

As component C), the inventive molding compositions comprise preferably 0.01 to 3% by weight, more preferably 0.02 to 2% by weight and especially 0.1 to 1.5% by weight of at least one heat stabilizer.

The heat stabilizers are preferably selected from copper compounds, secondary aromatic amines, sterically hindered phenols, phosphites, phosphonites and mixtures thereof.

If a copper compound is used, the amount of copper is preferably 0.003 to 0.5%, especially 0.005 to 0.3% and more preferably 0.01 to 0.2% by weight, based on the sum of components A) to C).

If stabilizers based on secondary aromatic amines are used, the amount of these stabilizers is preferably 0.2 to 2% by weight, more preferably from 0.2 to 1.5% by weight, based on the sum of components A) to C).

If stabilizers based on sterically hindered phenols are used, the amount of these stabilizers is preferably 0.1 to 1.5% by weight, more preferably from 0.2 to 1% by weight, based on the sum of components A) to C).

If stabilizers based on phosphites and/or phosphonites are used, the amount of these stabilizers is preferably 0.1 to 1.5% by weight, more preferably from 0.2 to 1% by weight, based on the sum of components A) to C).

Compounds of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of the hydrohalic acids or of the hydrocyanic acids or the copper salts of the aliphatic carboxylic acids. Particular preference is given to the monovalent copper compounds CuCl, CuBr, CuI, CuCN and $Cu_2O$, and to the divalent copper compounds $CuCl_2$, $CuSO_4$, CuO, copper(II) acetate or copper(II) stearate.

The copper compounds are commercially available, or the preparation thereof is known to those skilled in the art. The copper compound can be used as such or in the form of concentrates. A concentrate is understood to mean a polymer, preferably of the same chemical nature as component A), which comprises the copper salt in high concentration. The use of concentrates is a standard method and is employed particularly frequently when very small amounts of a feedstock have to be metered in. Advantageously, the copper compounds are used in combination with further metal halides, especially alkali metal halides, such as NaI, KI, NaBr, KBr, in which case the molar ratio of metal halide to copper halide is 0.5 to 20, preferably 1 to 10 and more preferably 3 to 7.

Particularly preferred examples of stabilizers which are based on secondary aromatic amines and are usable in accordance with the invention are adducts of phenylenediamine with acetone (Naugard A), adducts of phenylenediamine with linolenic acid, 4,4'-bis (α,α-dimethylbenzyl) diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers which are based on sterically hindered phenols and are usable in accordance with the invention are N,N'-hexamethylenebis-3-(3,5-di-tert-butyl-4-hydroxyphenyl)propionamide, bis(3,3-bis(4'-hydroxy-3'-tert-butyl phenyl)butanoic acid)glycol ester, 2,1'-thioethyl bis(3-(3,5-di-tert-butyl-4-hydroxyphenyl)propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl)phosphite, diisodecyl pentaerythrityl diphosphite, bis(2,4-di-tert-butylphenyl)pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl)pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz-[d,g]-1,3,2-dioxaphosphocin, 6-fluoro-2,4,8,10-tetra-tert-butyl-12-methyldibenz[d,g]-1,3,2-dioxaphosphocin, bis(2,4-di-tert-butyl-6-methylphenyl) methyl phosphite and bis(2,4-di-tert-butyl-6-methylphenyl) ethyl phosphite. More particularly, preference is given to tris[2-tert-butyl-4-thio(2'-methyl-4'-hydroxy-5'-tert-butyl) phenyl-5-methyl]phenyl phosphite and tris(2,4-di-tert-butylphenyl) phosphite (Hostanox® PAR24: commercial product from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec NC66 from BASF SE. More particularly, preference is given to heat stabilization exclusively based on CuI and KI. Aside from the addition of copper or copper compounds, the use of further transition metal compounds, especially metal salts or metal oxides of group VB, VIB, VIIB or VIIIB of the Periodic Table, is ruled out. In addition, it is preferable not to add any transition metals of group VB, VIB, VIIB or VIIIB of the Periodic Table, for example iron powder or steel powder, to the inventive molding composition.

The inventive molding compositions comprise preferably 0 to 30% by weight, more preferably 0 to 20% by weight, based on the total weight of components A) to C), of at least one flame retardant as additive C). When the inventive molding compositions comprise at least one flame retardant, they preferably do so in an amount of 0.01 to 30% by weight, more preferably of 0.1 to 20% by weight, based on the total weight of components A) to C). Useful flame retardants C) include halogenated and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 or 218768-84-4, and also EP 1095030), ammonium polyphosphate, trishydroxyethyl isocyanurate (optionally also ammonium polyphosphate in a mixture with trishydroxyethyl isocyanurate) (EP 584567). Further N-containing or P-containing flame retardants, or PN condensates suitable as flame retardants, can be found in DE 10 2004 049 342, as can the synergists customary for this purpose, such as oxides or borates. Suitable halogenated flame retardants are, for example, oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, Dechlorane, which are usually used with antimony oxides as synergists (for details and further flame retardants see DE-A-10 2004 050 025).

The antistats used in the inventive molding compositions may, for example, be carbon black and/or carbon nanotubes. The use of carbon black may also serve to improve the black color of the molding composition. However, the molding composition may also be free of metallic pigments.

Molding

The present invention further relates to moldings which are produced using the inventive copolyamides or polyamide molding compositions.

The inventive semiaromatic polyamides are advantageously suitable for use for production of moldings for electrical and electronic components and for high-temperature automotive applications.

A specific embodiment is moldings in the form of or as part of a component for the automotive sector, especially selected from cylinder head covers, engine hoods, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

A further specific embodiment is moldings as or as part of an electrical or electronic passive or active component of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

The inventive semiaromatic polyamides are additionally specifically suitable for use in soldering operations under lead-free conditions (lead free soldering), for production of plug connectors, microswitches, microbuttons and semiconductor components, especially reflector housings of light-emitting diodes (LEDs).

A specific embodiment is that of moldings as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses in automobile interiors are for dashboards, steering-column switches, seat components, headrests, center consoles, gearbox components and door modules, and possible uses in automobile exteriors are for door handles, exterior mirror components, windshield wiper components, windshield wiper protective housings, grilles, roof rails, sunroof frames, engine covers, cylinder head covers, intake pipes, windshield wipers, and exterior bodywork parts.

Possible uses of polyamides with improved flow for the kitchen and household sector are the production of components for kitchen machines, for example fryers, smoothing irons, knobs, and also applications in the garden and leisure sector, for example components for irrigation systems or garden equipment and door handles.

The examples which follow serve to illustrate the invention, but without restricting it in any way.

EXAMPLES

The polyamides are prepared by condensation in the melt in a stirred pressure autoclave. For this purpose, the appropriate amounts of terephthalic acid, isophthalic acid and hexamethylenediamine (HMD, 70% in water) were weighed in. The amount of water supplied with the HMD was 15% by weight, and about 0.03% by weight of sodium hypophosphite was added as a catalyst. For a stoichiometric mixture (hexamethylenediamine excess: 0 meq/kg), the following use amounts are accordingly used:

164.753 g of terephthalic acid 70.608 g of isophthalic acid 235.198 g of hexamethylenediamine (70% in water)

0.13 g of sodium hypophosphite

In the experiments in the table below, the amount of hexamethylenediamine was correspondingly adjusted according to the excess or deficiency (negative values) specified.

The feedstocks were introduced into the stirred autoclave at room temperature, and the latter was purged with nitrogen several times and then closed. The temperature in the tank was increased to 260° C. within 35 minutes by heating the tank wall, in the course of which the pressure rose to 40 bar. From a temperature of 150° C., the reaction mixture was stirred at 60 rpm. Then, while continuing to heat, the pressure is lowered using a decompression valve to a gauge pressure of 0 bar over the course of 20 minutes. At the same time, the temperature in the tank is increased further from 260° C. to 330° C. within this period. The gas phase removed from the tank in the course of the lowering of the pressure was passed through a condenser, collected as liquid condensate and weighed, and the proportion of volatile amine constituents was determined by acid titration. The number-average molecular weight $M_n$ and the polydispersity (PD) of the polymer withdrawn were analyzed by means of GPC (standard: PMMA).

TABLE 1

| Example No. | HMD excess [meq/kg] | Base content in the condensate [meq/kg] | Difference of HMD excess minus base content in the condensate [meq/kg] | $M_n$ | PD | $M_n$/PD | Melt viscosity eta[a] [Pa · s] |
|---|---|---|---|---|---|---|---|
| C1 | −310 | 83 | −393 | 10300 | 2.9 | 3552 | 670 |
| C2 | −210 | 95 | −305 | 10600 | 3.0 | 3533 | — |
| C3 | −110 | 110 | −220 | 13300 | 3.3 | 4030 | — |
| C4 | 190 | 131 | 59 | 27300 | 7.6 | 3592 | 20000 |
| 5 | 490 | 198 | 292 | 17300 | 2.2 | 7864 | 105 |
| 6 | 590 | 230 | 360 | 15800 | 1.8 | 8778 | — |
| C7 | 690 | 252 | 438 | 14200 | 2.1 | 6762 | — |

C = comparative example
[a] 330° C., 10 rad/s

Inventive examples 5 and 6 with a difference of HMD excess minus base content in the condensate of 292 and 360 meq/kg respectively feature a low polydispersity and an optimal ratio of $M_n$ to PD of greater than 7000. In addition, example 5 features very good melt flow characteristics compared to examples C1 and C4.

The invention claimed is:

1. A process for preparing a semiaromatic polyamide, comprising:
   a) providing a reactant composition comprising
      A) at least one unsubstituted or substituted aromatic dicarboxylic acid or a derivative thereof, and
      B) at least one aliphatic or cycloaliphatic diamine selected from the group consisting of ethylenediamine, propylenediamine, tetramethylenediamine, heptamethylenediamine, hexamethylenediamine, octamethylenediamine, nonamethylenediamine, 2-methyl-1,8-octamethylenediamine, decamethylenediamine, undecamethylenediamine, dodecamethylenediamine, 2-methylpentamethylenediamine, 2,2,4-trimethylhexamethylenediamine, 2,4,4-trimethylhexamethylenediamine, 5-methylnonamethylenediamine, 2,4-dimethyloctamethylenediamine, 5-methylnonanediamine, bis(4-aminocyclohexyl)methane, 3,3'-dimethyl-4,4'-diaminodicyclohexylmethane, and mixtures thereof,
      or a salt of at least one compound A) and at least one compound B),
   b) feeding the reactant composition provided in step a) into at least one polymerization zone and subjecting the reactant composition to a polymerization at elevated temperature and, at least at the start of the polymerization, at elevated pressure,
   c) withdrawing a water-containing gas phase from the polymerization zone in the course of the polymerization,
   with the proviso that the diamine component B) is used in the reactant composition with a stoichiometric excess of 300 to 650 meq/kg relative to the total weight of components used for amide formation in the reactant composition assuming a full conversion of the components used for amide formation, wherein the difference between the stoichiometric excess of the diamine component B) in the reactant composition and any portion of the diamine component B) which is discharged from the polymerization zone together with the water-containing gas phase in the course of the polymerization is in a range from 10 to 600 meq/kg.

2. The process according to claim 1, wherein the difference between the stoichiometric excess of the diamine component B) in the reactant composition and the portion of the diamine component B) discharged from the polymerization zone together with the water-containing gas phase is in the range from 50 to 500 meq/kg.

3. The process according to claim 1, wherein the reactant composition provided in step a) does not comprise any further components capable of amide formation in addition to components A) and B).

4. The process according to claim 1, wherein the reactant composition provided in step a) comprises at least one further component capable of amide formation, selected from the group consisting of
- C) unsubstituted or substituted aromatic diamines,
- D) aliphatic or cycloaliphatic dicarboxylic acids,
- E) monocarboxylic acids,
- F) monoamines,
- G) lactams,
- H) ω-amino acids,
- I) compounds which are different than A) to H) and are cocondensable therewith, and mixtures thereof.

5. The process according to claim 1, wherein the aromatic dicarboxylic acid A) used is terephthalic acid, isophthalic acid, or a mixture of terephthalic acid and isophthalic acid.

6. The process according to claim 1, wherein the reactant composition provided in step a) comprises, as component A), terephthalic acid and isophthalic acid in a molar ratio of 100:0 to 50:50.

7. The process according to claim 1, wherein hexamethylenediamine is present in component B to an extent of at least 50% by weight, based on the total weight of the diamine component B.

8. The process according to claim 1, wherein the polyamide is 6.T/6.I.

9. The process according to claim 1, wherein the semiaromatic polyamide obtained has a number-average molecular weight $M_n$ within a range from 13,000 to 25,000 g/mol.

10. The process according to claim 1, wherein the semiaromatic polyamide obtained has a polydispersity PD of not more than 3.0.

11. The process according to claim 1, wherein the semiaromatic polyamide obtained has a quotient of number-average molecular weight $M_n$ to PD of at least 7000.

12. The process according to claim 1, wherein the reactant composition is free from pentamethylenediamine.

13. A semiaromatic polyamide obtained by a process as defined in claim 1.

14. A polyamide molding composition comprising at least one polyamide obtained by a process as defined in claim 1.

15. The polyamide molding composition according to claim 14, comprising:
- A) 25 to 100% by weight of at least one copolyamide obtained by a process as defined in claim 1,
- B) 0 to 75% by weight of at least one filler and reinforcer, and
- C) 0 to 50% by weight of at least one additive,
- where components A) to C) together add up to 100% by weight.

16. A molding produced from a polyamide molding composition according to claim 14.

17. The molding according to claim 16, in the form of or as part of a component for the automotive sector.

18. The molding according to claim 16, in the form of or as part of an electrical or electronic component.

19. A method for producing electrical and electronic components and for components high-temperature automotive applications comprising the use of a semiaromatic polyamide obtained by a process defined in claim 1 or a molding composition as defined in claim 14.

20. The method according to claim 19, for the production of plug, connectors, microswitches, microbuttons, or semiconductor components.

21. The process of soldering under lead-free considerations comprising the use of a semiaromatic polyamide obtained by a process defined in claim 1.

* * * * *